(12) United States Patent
Jacobowitz

(10) Patent No.: US 11,412,708 B2
(45) Date of Patent: Aug. 16, 2022

(54) LIGHTED FLEA COMB

(71) Applicant: Just Fur Love, LLC, Boston, MA (US)

(72) Inventor: Naftoli Jacobowitz, New York, NY (US)

(73) Assignee: Just Fur Love, LLC, Boston, MA (US)

( * ) Notice: Subject to any disclaimer, the term of this patent is extended or adjusted under 35 U.S.C. 154(b) by 0 days.

(21) Appl. No.: 16/802,739

(22) Filed: Feb. 27, 2020

(65) Prior Publication Data
US 2020/0187454 A1 Jun. 18, 2020

Related U.S. Application Data

(60) Provisional application No. 62/811,005, filed on Feb. 27, 2019.

(51) Int. Cl.
| | |
|---|---|
| *A01K 13/00* | (2006.01) |
| *F21V 3/00* | (2015.01) |
| *F21V 23/00* | (2015.01) |
| *F21V 23/04* | (2006.01) |
| *F21V 33/00* | (2006.01) |
| *F21Y 103/10* | (2016.01) |
| *F21Y 115/10* | (2016.01) |

(52) U.S. Cl.
CPC ............ *A01K 13/00* (2013.01); *A01K 13/002* (2013.01); *F21V 3/00* (2013.01); *F21V 23/009* (2013.01); *F21V 23/04* (2013.01); *F21V 33/0004* (2013.01); *F21Y 2103/10* (2016.08); *F21Y 2115/10* (2016.08)

(58) Field of Classification Search
CPC .. A01K 13/00; A01K 13/002; F21V 33/0004; F21V 33/004
See application file for complete search history.

(56) References Cited

U.S. PATENT DOCUMENTS

| | | | |
|---|---|---|---|
| 9,913,520 B1 * | 3/2018 | Torres | F21L 4/00 |
| 2005/0166863 A1 * | 8/2005 | Park | A01K 13/00 119/625 |
| 2013/0324802 A1 * | 12/2013 | Makosky | A61B 17/50 600/249 |
| 2019/0075922 A1 * | 3/2019 | Rivera | G06N 5/046 |
| 2020/0085015 A1 * | 3/2020 | Yoo | A01K 13/001 |
| 2020/0086137 A1 * | 3/2020 | Yoo | A46B 15/0034 |

* cited by examiner

*Primary Examiner* — William N Harris
(74) *Attorney, Agent, or Firm* — Wolf, Greenfield & Sacks, P.C.

(57) ABSTRACT

Presented is a unique lighted flea comb suitable for all coat types and is specifically designed to extract fleas from a pet's fur even when the lighting condition is not optimal or during the absence of light. This feature allows a pet owner or a comb user to get a clear view of fleas or like parasites, and allow the comb user to easily remove them with the multi row and tightly spaced bristles of the comb. The proposed lighted flea comb is also built with a comfortable ergonomic handle with a groove for user's finger and curved body for superior control.

9 Claims, 6 Drawing Sheets

LIGHTED FLEA COMB

CROSS-REFERENCE TO RELATED PATENT DOCUMENTS

This patent application claims the benefit of priority of U.S. Provisional Application No. 62/811,005 entitled "LIGHTED FLEA COMB," filed Feb. 27, 2019, which is hereby incorporated herein by reference in its entirety.

FIELD OF THE INVENTION

The invention relates generally to pet grooming tools and, particularly, to a hand held tool/device for removal of fleas from household pets. More specifically, the present invention relates to an ergonomically designed lighted flea comb.

BACKGROUND

The common flea or parasites of like nature are tiny insect often seen by human but its presence is felt in a most discomforting manner by animals, particularly household animals, throughout most parts of the world. This parasitic creature lives on or in close proximity to household animals, such as cats, dogs and these parasites often derive their nourishment from animal blood. We also often see infestation of the animal's fur with fleas. These fleas do bite the animals to suck the blood from animal's body. The pet animals may also ingest the fleas while scratching and licking upon such bites. Such ingestion can lead to formation or growth of flea larvae in the animal's digestive tract.

In the past, various types of flea combs have been proposed by several inventors to overcome such flea infestations or removal of fleas from animals. For example, U.S. Pat. No. 9,516,861 discloses an ergonomically designed flea comb similar to a computer mouse. This patent proposes a lighted flea comb. This patent in particular discloses a flea comb apparatus having a retractable comb portion and having an illumination system that is energized when the flea comb is deployed but is de-energized when the flea comb is retracted.

US20150359192 discloses a flea vacuum device for removing fleas from a pet. The device comprises a housing, a vacuum mechanism for creating a vacuum at an end of the housing, a sprayer mechanism for spraying a flea eradicating liquid, a grooming comb releasably securable to the end of the housing, a power mechanism for powering the vacuum mechanism and the sprayer mechanism, a toggle switch that alternatingly switches power between a vacuum mode and a sprayer mode. Upon activation of the vacuum mechanism, the undesirable material enters the housing through the end of the housing. Upon activation of the sprayer mechanism, the flea eradicating liquid exits the housing through the end of the housing.

US20130301292 discloses a hand held black light used to remove and/or eliminate nits, lice, eggs or nymphs, fleas, bedbugs or ticks from the scalp of an affected person or animal or from environments in which remains may be found from having been in contact with the affected person or animal. The comb includes a body having a compartment for containing electric batteries. The body further includes a guide from which a comb structure is projected, formed by a plurality of curved teeth made of a flexible material that conducts black light. The comb further includes a group of diodes emitting black light. The diodes are arranged in correspondence with the guide such that the plurality of teeth can be lit up by the group of diodes U.S. Pat. No. 5,685,261 discloses an arrangement for gathering fleas from fur with a comb and wiping the fleas and loosened fur from the comb so as to deposit them into a closeable container for disposal.

While such known flea combs discussed above and others have been generally effective for their intended purposes. The known devices in the past have lot of shortcomings too, for examples, lot of known flea combs are designed in a way that's not very comfortable to hold on to hands and thus removal of fleas from the fur of pets become difficult. Further, in lot of known combs, the orientation of bristles or teeth is improper (they are wide spaced) and thus doesn't effectively remove the fleas out of the fur of the pet. Not only is this, identifying the fleas present over the pet's fur is one of the common challenges the pet owners often face while combing the fur of the pet in low lighting conditions. During low lighting conditions, the users often fail to figure out if the combing is satisfactorily done or not.

Thus, in the light of the foregoing, there exists a need for an improved and reliable solution that would solve one or more of the above-mentioned problems. Thus, inventor herein proposes an easy to use flea comb for the removal of fleas from a pet's fur.

BRIEF SUMMARY

The foregoing summary, as well as the following detailed description of preferred embodiments, will be better understood when read in conjunction with the appended drawings. There is shown in the drawings example embodiment(s), however, the application is not limited to the specific system and method disclosed in the drawings. At least one exemplary embodiment provides Disclosed is a unique comb suitable for all coat types and is specifically designed to extract fleas from a pet's fur even when the lighting condition is not optimal or during absence of light. This feature allows a pet owner or a comb user to to get a clear view of fleas or like parasites to allow the comb user can easily remove or isolate them with the multi row and tightly spaced bristles of the comb. The proposed lighted flea comb is also built with a comfortable ergonomic handle with a groove for a user's finger and curved body for superior control.

It is an objective of the present invention to provide an ergonomically designed lighted flea comb that would overcome or at least ameliorate the shortcomings associated with the known flea combs.

It is another objective of the present invention to provide a lighted flea comb that would assist a pet owner in identifying fleas effectively during combing the fur/undercoat of the pet.

It is another objective of the present invention to provide an ergonomic flea comb that can illuminate the fur of the pet during combing in order to increase visibility of the flea or the like parasites present within the pet's fur.

These and other features, objectives and advantages of the present invention will be better understood with reference to the following drawings, and description.

DETAILED DESCRIPTION

Figure 1:
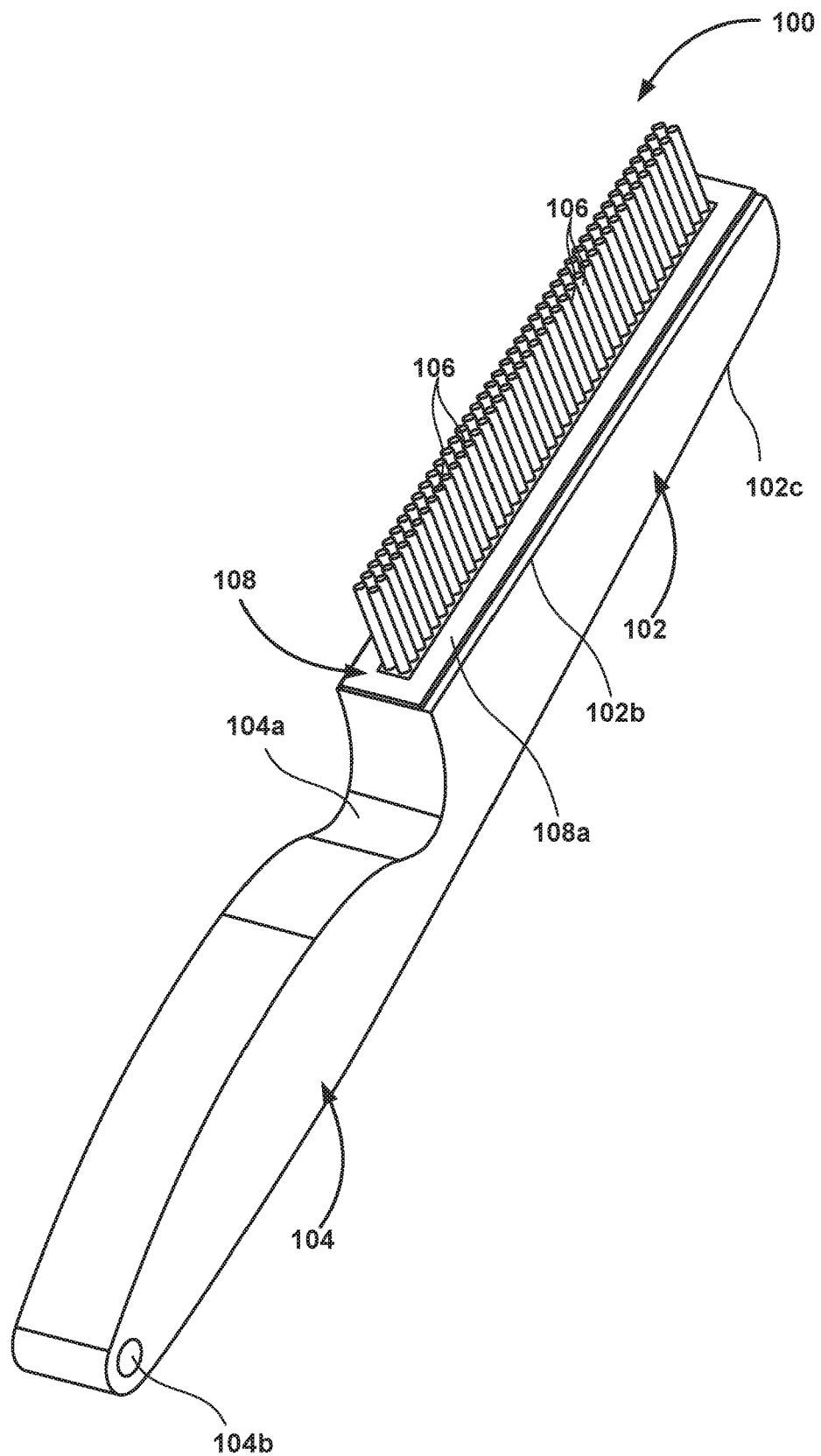
FIG. 1 shows a front perspective view of a lighted flea comb, according to an exemplary embodiment of the present invention.
Figure 2:
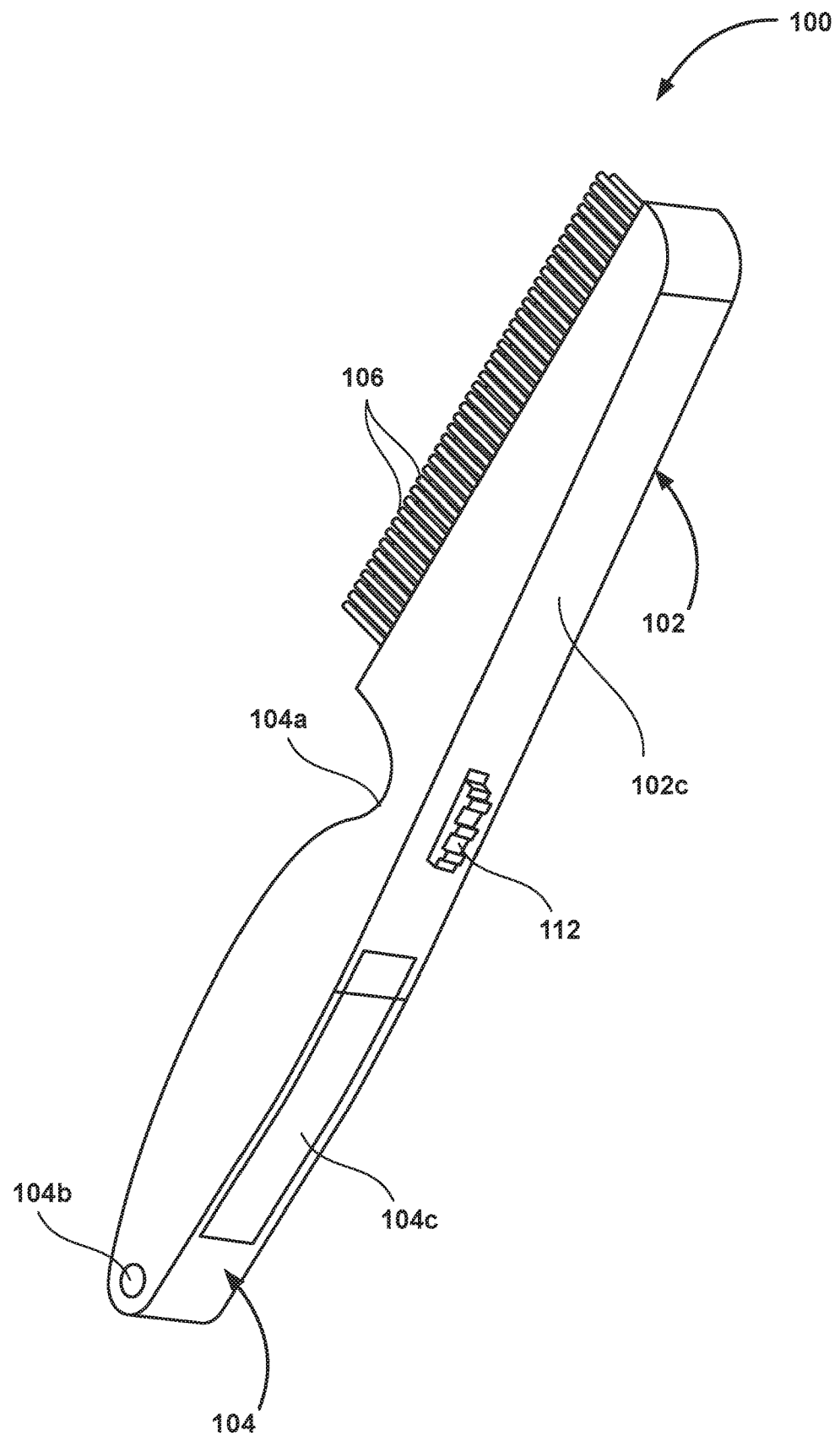
FIG. 2 shows a back perspective view of the lighted flea comb of the FIG. 1.

As used in the specification and claims, the singular forms "a", "an" and "the" may also include plural references. For example, the term "an article" may include a plurality of articles. Those with ordinary skill in the art will appreciate that the elements in the Figures are illustrated for simplicity and clarity and are not necessarily drawn to scale. For example, the dimensions of some of the elements in the figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of components, which constitutes an ergonomically designed lighted flea comb. Accordingly, the components have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment. The words "comprising", "having", "containing", and "including", and other forms thereof, are intended to be equivalent in meaning and be open ended in that an item or items following any one of these words is not meant to be an exhaustive listing of such item or items or meant to be limited to only the listed item or items.

The various features and embodiments of a lighted flea comb of the present invention are better explained with reference to FIGS. 1-6.

Figure 3:
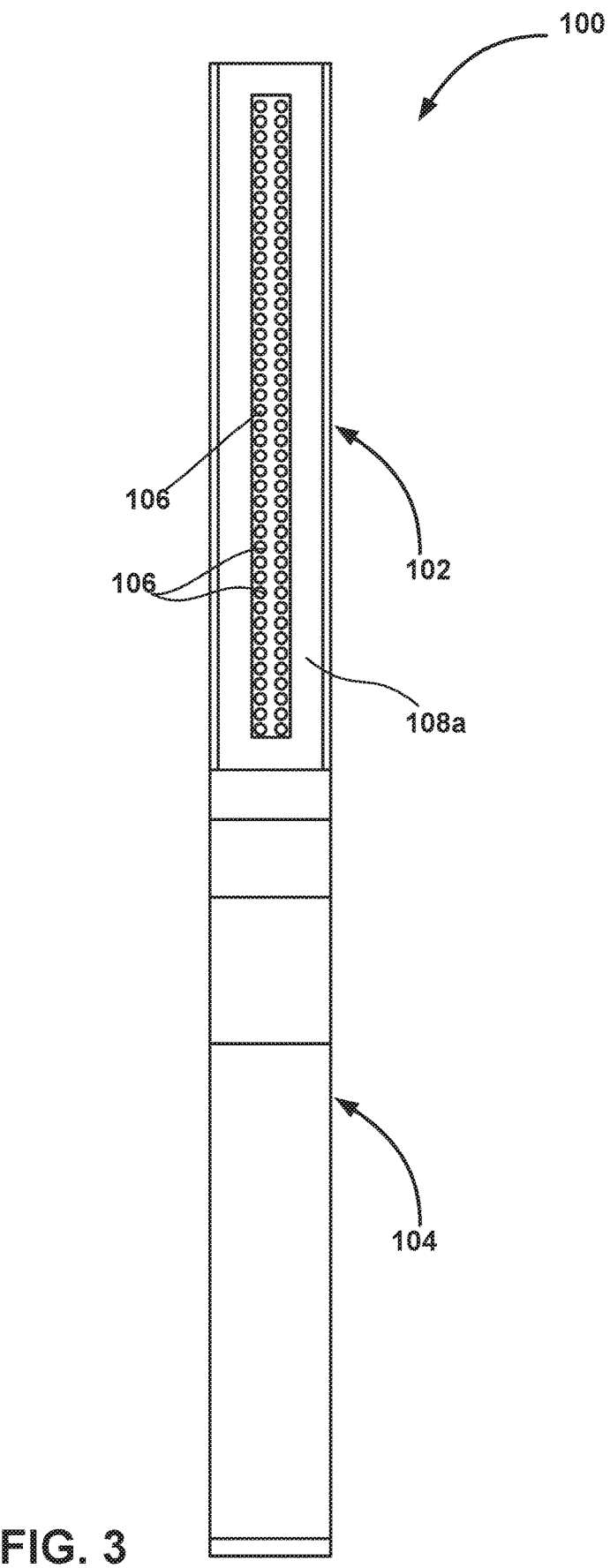
FIG. 3 shows a front view of the lighted flea comb of the FIG. 1.
Figure 4:
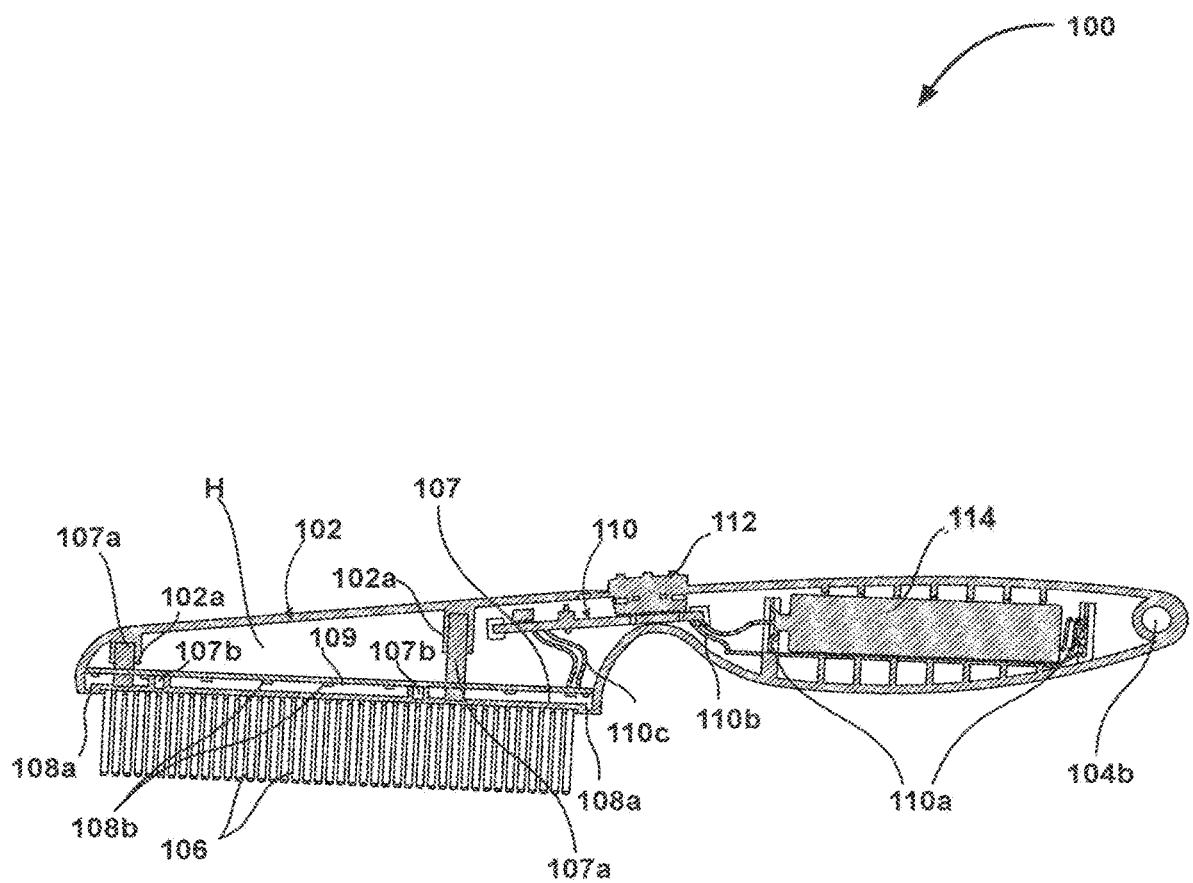
FIG. 4 shows an exploded view of the lighted flea comb of the FIG. 1.
Figure 5:
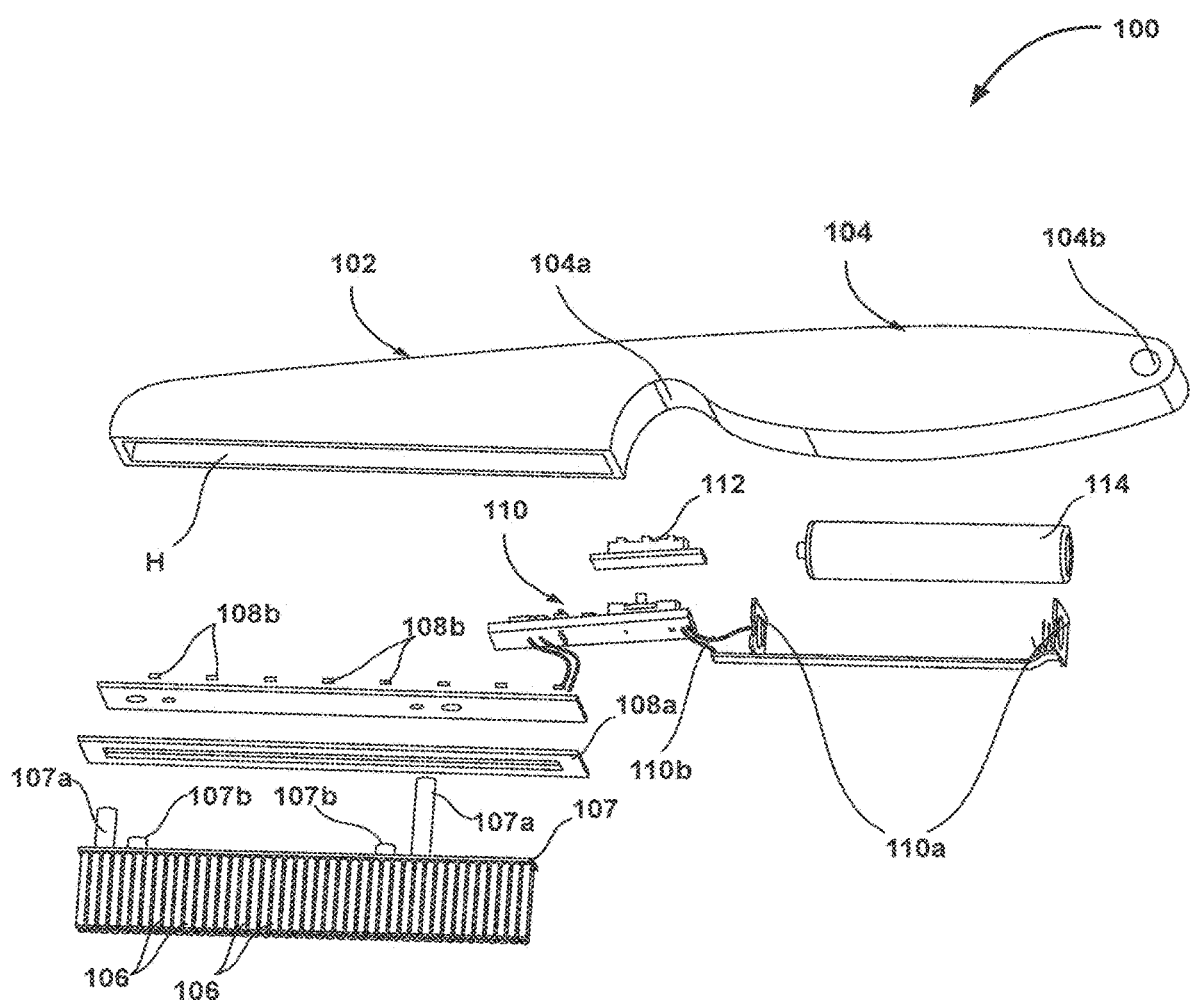
FIG. 5 shows a cross sectional side view of the lighted flea comb of the FIG. 1.

Collectively referring to the accompanying FIGS. 1-6, the flea comb 100 primarily includes a head section 102, and a handle section 104. According to an embodiment of the present invention, the head section 102 of the comb 100 includes a first end, and a second end. The head section 102 further includes a front face 102b and a rear face 102c. The head section 102 includes a bristles head 107 having a plurality of bristles 106 extending outward therefrom. In some other embodiment, the bristle head 107 may be absent and the bristles may be presented configured directly over the front face wall of the head section. According to the embodiment, the bristles 106 on the bristles head 107 may be configured in multiple closely spaced rows (Eg. dual rows (as seen in FIGS. 1 and 3, triple rows and so on) such that when the comb 100 is used to comb the fur of an infested pet, the bristles 106 can easily separate the fleas from the fur of the pet for disposal. The bristles head 107 is mounted over the front face 102b of the head section 102. According to an embodiment, the bristles head 107 comprises one or more engagement members 107a (as seen in FIGS. 4-5). The engagement members 107a are configured over a rear surface of the bristles head 107. These engagement members 107a of the bristles head 107 engages to or are received by one or more receiving channels 102a located over the rear face 102c within an interior cavity H (as seen in FIGS. 4-5) of the head section 102 in order to facilitate in mounting of the bristles head 107 over the front face 102b of the head section 102.

According to the embodiment of the present invention, the handle section 104 includes a proximal end and a distal end. The handle section 104 is ergonomically designed and extends away from the second end of the head section 102. According to some other embodiment, the head section 102 and the handle section 104 may be foldably attached using some suitable mechanisms known in the art. Alternatively, the head section 102 and the handle section 104 may be releasably attached using some snap fit mechanism.

The handle section 104 is ergonomically designed to facilitate a comfortable grip when the comb 100 is hand held by a comb user. The handle section 104 is designed to include a groove 104a located at its proximal end and is connected to the second end of the head section 102. The groove 104a of the handle 104 is for user's finger. Further the handle section 104 has a slightly curved body at its front face in order to provide a superior control to the comb user while handling the comb 100. Further, according to an embodiment, the handle section 104 is designed to include a slot 104b configured in proximity to the distal end of the handle section 104. The slot 104b may be used to embody a fastener (not seen) that may be threaded therethrough to form a loop or to connect some hooks so as to facilitate the comb user to hang the comb 100 over a wall surface or similar support surfaces when the comb 100 is not in use.

Figure 6:
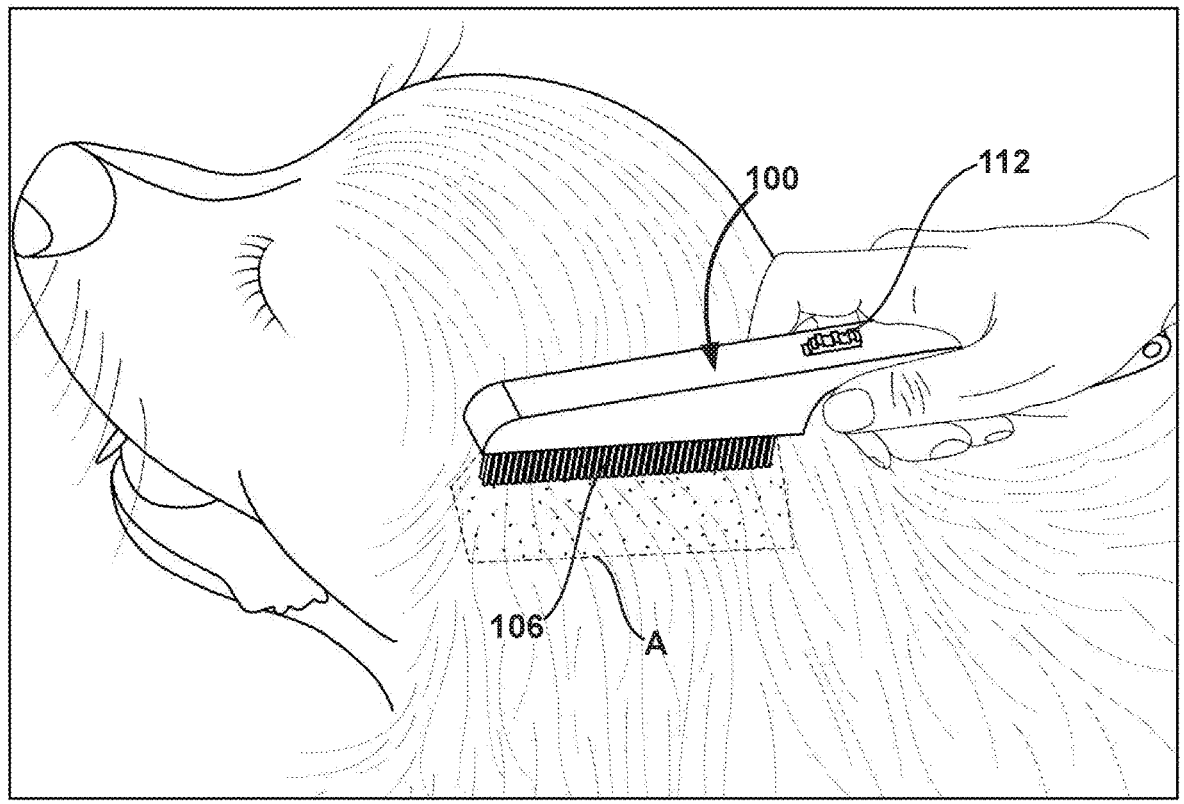
FIG. 6 shows the lighted flea comb of the FIG. 1, in use for removal of the flea from the undercoat/fur of a pet.

The proposed flea comb 100 further includes an illumination system 108. The illumination system 108 includes a light diffuser plate or sheet 108a (or a fluorescent light cover or film) configured over the front face 102b of the head section 102 surrounding the bristles head 107 (as seen in FIGS. 1 and 4). In an example, the light diffuser plate 108a may be but not limited to a matte (frosted) diffuser plate with thickness ranging from 1.5 mm-1.8 mm according to an example. According to the embodiment, the diffuser sheet or plate 108a is made rectangular in shape (with four sides) in correlation to the bristles head 107 over which the light diffuser sheet or plate sits. One skilled in the art should understand that the shape and dimension for the diffuser plate 108a can be selected based on design requirements, for example, if the bristles head 107 is designed to be oval then accordingly the shape and size of the diffuser plate 108a may be chosen. The diffuser plate 108a is characterized to scatter or spread the light emitted by light sources (as seen in FIG. 6) such as to give a softer output light.

The illumination system 108 further includes a plurality of light sources 108b disposed within an interior cavity H of the head section 102 in correlation to the light diffuser plate 108a such that when the light sources 108b are activated, light emitted from the light sources 108b is able to diffuse through the diffuser plate 108a to illuminate fur of the pet. The light sources 108b may include but not limited to LEDs or any other suitable light sources capable of emitting visible light. In an embodiment, the LEDs or LED stripes may be configured over a board 109. The board 109 in the context of the present invention means an electronic circuit that can provide a mechanical support and a pathway to the LEDs mounted thereon. The board 109 (for example a printed circuit board) may be positioned at a predetermined distance apart from the diffuser plate 108a such that when the device 100 is assembled, the LEDs/light sources 108b align just back side of the diffuser plate 108a such that the light emitted by the light sources 108b can then pass through the diffuser plate 108a to illuminate the pet's fur. In an example, the predetermined distance separation between the light diffuser plate 108a and the light sources 108b is facilitated by one or more protrusions 107b configured over the rear surface of the bristles head 107 (as seen in FIGS. 4 and 5).

The illumination system 108 further includes a drive circuitry 110 configured in the form of a board or a PCB board for controlling activation or deactivation of the light sources 108b in response to a switching action from a switch 112 when the switch 112 is operated by the comb user from a first position to a second position. The switch 112 may be switched to the first position to switch ON the light sources 108b in order to illuminate the fur of the pet, and may be switched to the second position to switch OFF the light sources 108b. In particular, when the switch 112 is switched to the first position to switch ON the light sources 108b, the two side plates 110a come in contact with the two terminals of the power source to complete the circuitry and the current flows to the drive circuitry 110 through the electrical path created by wire 110b. The electricity is then conveyed to the board 109 (via wire 110c) having mounted the light sources 108b to switch on the light sources 108a. Likewise, when the switch 112 is switched to the second position to switch OFF the light sources 108b, the two side plates 110a loses the contact with the two terminals of the power source 114 and thus making the circuit incomplete and thus stopping the flow of electricity from the power source 114 to the light sources 108a.

The drive circuitry 110 may be disposed within the interior cavity of the head section 102, or within an interior cavity of the handle section 104. Further, the drive circuitry 110 may be disposed partially within the head section 102 and partially within the handle section 104 as best seen in FIG. 4. The drive circuitry 110 is powered by a power source 114 located within the interior cavity of at least one the handle section 104 (as seen in FIG. 4) accessible by the comb user. In an example, on the rear face of the handle section 104 there may be an openable cover 104c that the comb user can remove to access the power source 114 housed within the interior cavity of the handle section 104. In some other embodiments, the power source 114 may be located within the interior cavity H of the head section 102.

The power source 114 may preferably include one or more batteries. In some embodiments, the comb 100 may include a rechargeable power source, such as rechargeable batteries, so that the comb 100 can be charged by just plugging on a power outlet. In an embodiment, if the comb 100 is powered by removal battery as best seen in FIG. 4, the handle section 104 may be provided with a provision to house the battery therein such as openable cover 104c in the exemplary embodiment that would provide an access to interior cavity of the handle section 104 where the battery may be mounted.

Although not shown, the drive circuitry 110 or the board 109 may comprise of one or more microcontrollers, and a memory unit. Suitable logics or programs that define the operation of the comb 100 specifically the switch 112 that operatively activates and deactivates the light sources, may preferably be stored in the memory unit. From memory unit the logic or programs can be fetched and executed by the microcontrollers to perform the intended operation of switching the light sources ON or OFF.

The comb body comprising of the head section 102 and the handle section 104 may be made of thermoplastic material or constructed using various other materials, including, but not limited to, metal, wood, ceramic, etc. Further, different parts, and components forming the proposed comb 100 or a portion thereof may be made using any suitable materials and in many different sizes, thus the scope of the present invention should not be limited to any specific materials or sizes of the components used in the construction of the comb 100.

Referring to FIG. 6, in operation, the comb 100 is first brought near the fur of the pet (such as a dog) to comb and isolate the fleas or like parasite from the fur or undercoat of the pet. The comb user firstly verify if the light sources 108b within the comb are glowing or not, and then if the light sources 108b are found to be OFF, then the user will toggle the switch 112 from the OFF state (the second position) to ON position (the first position). Once the light sources 108b within the head section 102 are switched ON, the light emitted by the light sources 108b is passed through the light diffuser plate 108a to illuminate the fur and increase the visibility of the fleas as seen in the dotted form in FIG. 6. The diffuser plate 108a scatters the light from internal light sources 108b to producer softer light to illuminate larger section (represented with broken line 'A' in FIG. 6) of the pet's fur so that the fleas can easily be identified and simultaneously removed with combing action.

The preceding description has been presented with reference to preferred embodiments. Persons skilled in the art and technology to which this application pertains will appreciate that alterations and changes in the described structures and methods of operation can be practiced without meaningfully departing from the principle, spirit and scope of the present invention.

What is claimed is:

1. A lighted flea comb, comprising:
  a head section having a first end, and a second end;
  a handle section having a proximal end and a distal end, the handle section extending away from the second end of the head section, wherein the handle section is ergonomically designed to facilitate a comfortable grip when the comb is hand held by a comb user;
  a bristles head comprising a plurality of bristles extending outward therefrom, the bristles head is mounted over a front face of the head section;
  an illumination system including
    a light diffuser plate configured over the front face of the head section surrounding the bristles head;
    a plurality of light sources disposed within an interior cavity of the head section in correlation to the light diffuser plate such that in the event when the light sources are activated, light emitted from the light sources is able to diffuse through the light diffuser plate to illuminate fur of a pet; and a drive circuitry configured for controlling activation or deactivation of the light sources in response to a switching action from a switch, wherein the switch is switched to: a first position to switch ON the light sources in order to illuminate the fur of the pet, and a second position to switch OFF the light sources.

2. The lighted flea comb of claim 1, wherein the handle section is designed to include a groove at the proximal end thereof that connects to the second end of the head section.

3. The lighted flea comb of claim 1, wherein the handle section is designed to include a slot configured in proximity to the distal end of the handle section.

4. The lighted flea comb of claim 1, wherein the bristles head comprises one or more engagement members configured over a rear surface thereof.

5. The lighted flea comb of claim 4, wherein the engagement members of the bristles head are configured to be received by one or more receiving channels located over a rear face within an interior cavity of the head section in order to facilitate in the mounting of the bristles head over the front face of the head section.

6. The lighted flea comb of claim 1, wherein the light sources are disposed separated at a predetermined distance from the light diffuser plate within the interior cavity of the head section.

7. The lighted flea comb of claim 6, wherein the predetermined distance separation between the light diffuser plate and the light sources is facilitated by one or more protrusions configured over the rear surface of the bristles head.

8. The lighted flea comb of claim 1, wherein the drive circuitry is disposed within the interior cavity of the head section, or within an interior cavity of the handle section, or disposed partially within the head section and partially within the handle section.

9. The lighted flea comb of claim 1, wherein the drive circuitry is powered by a power source located within the interior cavity of at least one of the handle section, or the head section accessible by the comb user.

* * * * *